(12) United States Patent
Watanabe et al.

(10) Patent No.: US 7,123,370 B2
(45) Date of Patent: Oct. 17, 2006

(54) CONTROL SYSTEM AND UNITS REMOVABLY ATTACHABLE TO THE SAME

(75) Inventors: Gaku Watanabe, Tokyo (JP); Kenichi Kondo, Kanagawa-ken (JP); Nobuo Fukushima, Kanagawa-ken (JP); Masayoshi Sekine, Tokyo (JP); Koichi Sono, Kanagawa-ken (JP); Motohiro Ishikawa, Kanagawa-ken (JP); Yuji Koide, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 177 days.

(21) Appl. No.: 10/806,305

(22) Filed: Mar. 22, 2004

(65) Prior Publication Data

US 2004/0178775 A1    Sep. 16, 2004

Related U.S. Application Data

(62) Division of application No. 09/964,898, filed on Sep. 27, 2001, now Pat. No. 6,956,678, which is a division of application No. 08/677,824, filed on Jul. 10, 1996, now Pat. No. 6,545,775.

(30) Foreign Application Priority Data

Jul. 21, 1995  (JP) .......................... HEI 07-185450
Jul. 24, 1995  (JP) .......................... HEI 07-187433

(51) Int. Cl.
G06K 15/00  (2006.01)
(52) U.S. Cl. ...................... 358/1.14; 358/422; 358/321
(58) Field of Classification Search ................ 358/468, 358/400, 401, 474, 496, 497, 442, 406, 437, 358/446, 422, 421, 436, 1.14, 504

See application file for complete search history.

(56) References Cited

U.S. PATENT DOCUMENTS

| 4,595,268 | A |   | 6/1986  | Tsuboi .................... 396/177 |
| 6,137,868 | A | * | 10/2000 | Leach .................. 379/106.01 |
| 6,822,764 | B1| * | 11/2004 | Okabe et al. ............... 358/442 |
| 2002/0045425 | A1 | * | 4/2002 | Takeda et al. ................ 455/41 |
| 2003/0112652 | A1 | * | 6/2003 | Shimada et al. ............ 365/154 |
| 2004/0178775 | A1 | * | 9/2004 | Watanabe et al. .......... 323/234 |
| 2004/0246512 | A1 | * | 12/2004 | Miyamoto ................ 358/1.13 |
| 2005/0052681 | A1 | * | 3/2005 | Kogi ........................ 358/1.14 |

FOREIGN PATENT DOCUMENTS

| JP | 61-195083 |   | 8/1986 |
| JP | 01-155778 |   | 6/1989 |
| JP | 03-195331 |   | 8/1991 |
| JP | 04-160986 |   | 6/1992 |
| JP | 06-067766 |   | 3/1994 |
| JP | 06-105267 |   | 4/1994 |
| JP | 07-141069 |   | 6/1995 |
| JP | 07-177496 |   | 7/1995 |
| JP | 07-184093 |   | 7/1995 |
| JP | 7-283895  | * | 10/1995 |
| JP | 06-292061 |   | 10/2005 |
| WO | WO 94/14274 |   | 6/1994 |

OTHER PUBLICATIONS (Online) Retrieved from the Internet: URL: http://msdn.microsoft.com/library/defautl.asp?url=library/en-us/dndevio/html/msdn_pnpapp.asp> Lee Fischer, Win32 Application Support for Plug and Play, Jan. 18, 1995.

* cited by examiner

*Primary Examiner*—Jerome Grant
(74) *Attorney, Agent, or Firm*—Cowan, Liebowitz & Latman, P.C.

(57) ABSTRACT

A control system having device units removably attachable to a control device such as a computer is arranged to optimize the allocation and distribution of electric power to the device units and also displays of varied kinds. For this purpose, each device unit of the system includes a communication circuit arranged to transmit information of electric power consumption and an operating state of the device unit detachably connected to the control device such as a computer, a stopping circuit for partly stopping a function of the device unit according to a control signal sent in reply from the control device on the basis of information of varied kinds transmitted through the transmission circuit to the control device. The control device, on the other hand, includes a communication circuit arranged to receive the information on the device unit from the device unit, and a control circuit arranged to compare the information of electric power consumption and the operating state received by the communication circuit with information of the amount of electric power which can be supplied to the device unit and to send the control signal to the device unit for partly stopping the function of the device unit according to the result of comparison. Further, the control device changes a display made therein and controls the operation of the device unit according to information of the operating state and the connected state of the device unit.

4 Claims, 12 Drawing Sheets

CONTROL SYSTEM AND UNITS REMOVABLY ATTACHABLE TO THE SAME

CROSS-REFERENCE TO RELATED APPLICATIONS

This application is a divisional of application Ser. No. 09/964,898, filed Sep. 27, 2001 now U.S. Pat. No. 6,956,678, which is a divisional of application Ser. No. 08/677,824 filed Jul. 10, 1996 now U. S Pat. No. 6,545,775.

BACKGROUND OF THE INVENTION

1. Field of the Invention

This invention relates to a control system, a power supply device, a device unit, an image pickup system, etc., in which a plurality of device units such as an image pickup unit, etc., are removably attached for use to a control device.

2. Description of the Related Art

Computers of the kind having connection terminals such as PCMCIA slots are generally arranged to use card-shaped device units arranged to function differently as a facsimile, memories, etc., with these device units inserted into the connection terminals. The connection terminals are arranged not to limit the usable device units. The operator of such a computer is, therefore, allowed to select any of such card-shaped device units having a desired function. FIG. 1 shows by way of example an image pickup system including a computer and an image pickup unit removably attachable to the computer. The image pickup system is described by way of example as follows.

Referring to FIG. 1, the image pickup system includes an image pickup unit (camera unit) 23 which is formed in a card-like shape, a computer 25 and a connection terminal 26 provided for connecting the image pickup unit 23 to the computer 25.

The image pickup system picks up an image by means of an optical system and a CCD which are disposed within the image pickup unit 23. The image picked up is converted into digital data. The picked-up image data is transferred via the connection terminal 26 to the computer 25. The computer 25 contains therein a display device and a recording device. The picked-up image data from the image pickup unit 23 is displayed and recorded by the computer 25.

In the image pickup system shown in FIG. 1, the computer 25 has another connection terminal 27. A device unit 24 having a function which differs from the function of the image pickup unit 23 is connected to the connection terminal 27, which is arranged to function in the same manner as the connection terminal 26. Any device unit that can be connected to one of the connection terminals 26 and 27 is connectable also to the other connection terminal.

The device unit 24 is, for example, arranged to function as a facsimile (hereinafter referred to as a fax card). With the fax card 24 connected to the connection terminal 27, the picked-up image data recorded within the computer 25 is transmitted. The computer 25 controls the image pickup unit 23 and the fax card 24 which are respectively connected to the connection terminals 26 and 27 and, at the same time, also supplies electric power to them.

The image pickup system shown in FIG. 1 which is configured as described above is capable of performing an image pickup action, recording and displaying the picked-up image data and, with the fax card 24 connected to the computer 25, transmitting the picked-up image data. In a case where the image pickup unit 23 or the fax card 24 is not used, it may be used for some other apparatuses by detaching it from the connection terminal 26 or 27.

The method employed for the above-stated system, however, has presented the following problem.

The computer 25 constantly supplies electric power to the connected device units irrespectively of the operating or nonoperating state of the device units. Accordingly, even when only the fax card 24 is being used while the image pickup unit 23 is also attached to the computer 25 but is not being used, the computer 25 supplies electric power also to the image pickup unit 23, so that electric power is wasted. Alternatively, even when only the image pickup unit 23 is being used with the fax card 24 not being used, the computer 25 supplies electric power also to the fax card 24, so that electric power is wasted.

In cases where the computer 25 is arranged to be driven by the electric energy of a power source of a limited capacity such as a battery or the like, the amount of electric power consumed by the device units connected to the connection terminals of the computer 25 presents a serious problem. When a total of electric power consumed by the device units connected to the computer 25 is larger than the amount of electric power which can be supplied from the computer 25, one of or all of the device units connected to the computer 25 become inoperative or the computer 25 might come to malfunction. Such a malfunction has often caused the image pickup system to stop operating.

Further, in cases where an image pickup action is a primary function, electric power tends to be consumed so much by the fax card 24 to prevent adequate fulfillment of the image pickup action. In such a case, it has been necessary either to remove the fax card 24 from the computer 25 or to manually cut off the supply of electric power to the fax card 24.

Further, the image pickup system and an image signal processing device related thereto have presented the following problems.

There has been no means for enabling the operator of the image pickup system or the computer to confirm the connected state of the image pickup unit. Therefore, if a program of control over the image pickup unit happens to be executed in a state of having the image pickup unit not adequately connected to the computer, either the program or the computer might malfunction to necessitate a long period of time before resumption of its normal state.

Further, with the computer having a plurality of connection terminals, if the connection terminal to which the image pickup unit is connectable is limited among the plurality of connection terminals, there is a probability that the image pickup unit will be connected to a wrong connection terminal.

Further, there has been no means for enabling the operator of the image pickup system or the computer to confirm the operating state of the image pickup unit. Therefore, if the picked-up image data is not monitored by means of a display device contained in the computer, it has been impossible to confirm the operating state of the image pickup unit. Even in a case where the picked-up image data is arranged to be monitored, it has been sometimes hardly possible to intuitionally know the data of operation such as the image pickup speed of the image pickup unit and the number of colors in use, etc.

Further, the image pickup system has been provided with no means for enabling the operator of the image pickup system to know the pickup conditions under which previous image data has been obtained.

Further, in a case where the image pickup unit has a lens cover, the opened or closed state of the lens cover has nothing to do with the operation of the image pickup unit. In such a case, the lens cover has necessitated the operator of the image pickup system to close the lens cover when the image pickup unit is not used. Besides, it has sometimes happened that the operator of the image pickup system inadvertently operates the image pickup unit with the lens cover left closed.

SUMMARY OF THE INVENTION

It is an object of this invention to provide an image pickup system in which an image pickup unit is connected for use to an image processing computer, which image pickup system is arranged to display to an operator an operating state and a connected state of the image pickup unit and record the operating state and the connected state and thus to effectively prevent any erroneous operation from being performed by the operator of the image pickup system.

It is another object of this invention to provide a control system having a control device, such as a computer, having a connection terminal and a device unit, such as an image pickup unit, connectable to the connection terminal, in which electric power is allocated between the device unit and the control device in an optimum manner for the purpose of preventing malfunctions due to a stoppage of operation of the device unit and a drop in voltage of a power supply.

To attain the above objects, in accordance with one aspect of this invention, there is provided an image pickup system comprising communication means for transmitting and receiving data between an image pickup unit and a computer which are interconnected, means provided at the image pickup unit or the computer for detecting, displaying and recording an operating state and a connected state of the image pickup unit, and means for causing a device for protecting a lens of the image pickup unit to operate according to a result of the detection of the operating state and the connected state.

To attain the above objects, in accordance with another aspect of this invention, there is provided an image pickup unit comprising image pickup means for picking up an optical image to form a picked-up image signal, interface means for communication with an external signal processing device, and transmission means for transmitting to the external signal processing device through the interface means a state signal relating to an operating state of the image pickup means or a connected state of the interface means.

To attain the above objects, in accordance with another aspect of this invention, there is provided a picked-up image signal processing device comprising interface means for communication with an image pickup unit which includes image pickup means for picking up an optical image to form a picked-up image signal, and receiving means for receiving a state signal coming from the image pickup unit through the interface means and relating to an operating state or a connected state of the image pickup unit.

To attain the above objects, in accordance with another aspect of this invention, there is provided a control system comprising a unit which is removably attachable to a control device and includes transmission means for transmitting information of power consumption of the unit and stop means for partly stopping a function of the unit according to a control signal sent in reply from the control device on the basis of the information of power consumption transmitted by the transmission means to the control device, receiving means for receiving from the unit removably attachable to the control device the information of power consumption of the unit, comparison means for comparing the information of power consumption received by the receiving means with information of an amount of electric power which can be supplied to the unit from the control device, and control means for transmitting the control signal to the unit so as to partly stop the function of the unit according to an output of the comparison means.

To attain the above objects, in accordance with another aspect of this invention, there is provided a control device comprising communication means for receiving from a unit removably attachable to the control device information of power consumption of the unit, comparison means for comparing the information of power consumption received by the communication means with information of an amount of electric power which can be supplied from the control device to the unit, and control means for transmitting a control signal to the unit so as to partly stop a function of the unit according to an output of the comparison means.

To attain the above objects, in accordance with another aspect of this invention, there is provided a unit which is removably attachable to a control device and comprises communication means for transmitting information of power consumption of the unit, and stop means for partly stopping a function of the unit according to a control signal sent in reply from the control device on the basis of the information of power consumption transmitted by the communication means to the control device.

To attain the above objects, in accordance with another aspect of this invention, there is provided an image pickup system comprising a control device having a plurality of connection terminals and a power supply, a plurality of device units connectable to the connection terminals, determination means for predetermining amounts of allocation of electric power to be supplied from the control device respectively to the plurality of device units connected to the connection terminals, detecting means for detecting amounts of electric power being consumed respectively by the plurality of device units, comparison means for comparing the amounts of allocation of electric power with the amounts of electric power being consumed, and change-over means for changing at least one operation of the plurality of device units over to a power saving mode according to a result of comparison made by the comparison means. The provision of these means effectively prevents the image pickup system from malfunctioning due to sudden stoppage of operation of some of the device units such as an image pickup unit, a drop in voltage of the power supply and also enables the system to make a distribution of electrical energy apposite to the actions of the device units.

According to this invention, in a case where a computer adapted for image processing is used with an image pickup unit connected thereto as an image pickup system, the image pickup system enables the operator of the system to know an operating state and a connected state of the image pickup unit and to reproduce actions previously performed by the image pickup unit and effectively prevents the operator from performing an erroneous operation.

Further, the control system according to this invention not only effectively prevents occurrence of a malfunction due to sudden stoppage of operation or a drop in voltage of a power supply but also enables the control device to make an electric energy or power distribution appositely to the operation of the system.

These and other objects and features of this invention will become apparent from the following detailed description of preferred embodiments thereof taken in connection with the accompanying drawings.

DETAILED DESCRIPTION OF THE PREFERRED EMBODIMENTS (First Embodiment)

A first embodiment of this invention is described with reference to FIGS. 2 to 5.

Figure 1:
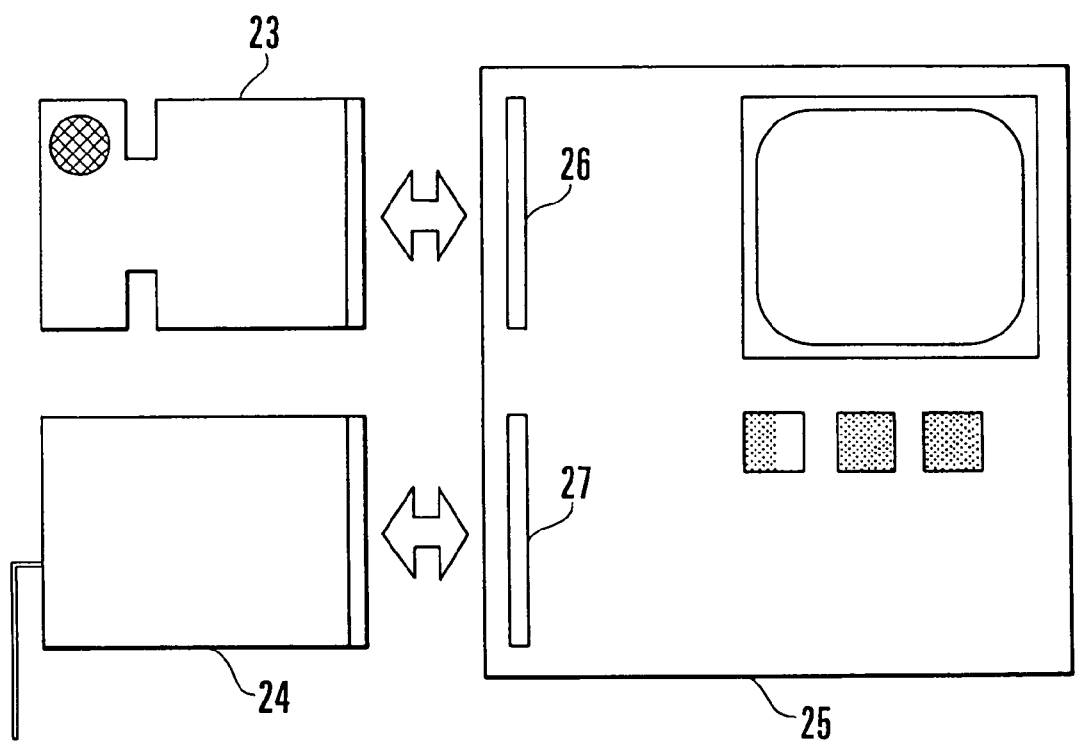
FIG. 1 shows by way of example the arrangement of a conventional image pickup system.
Figure 2:
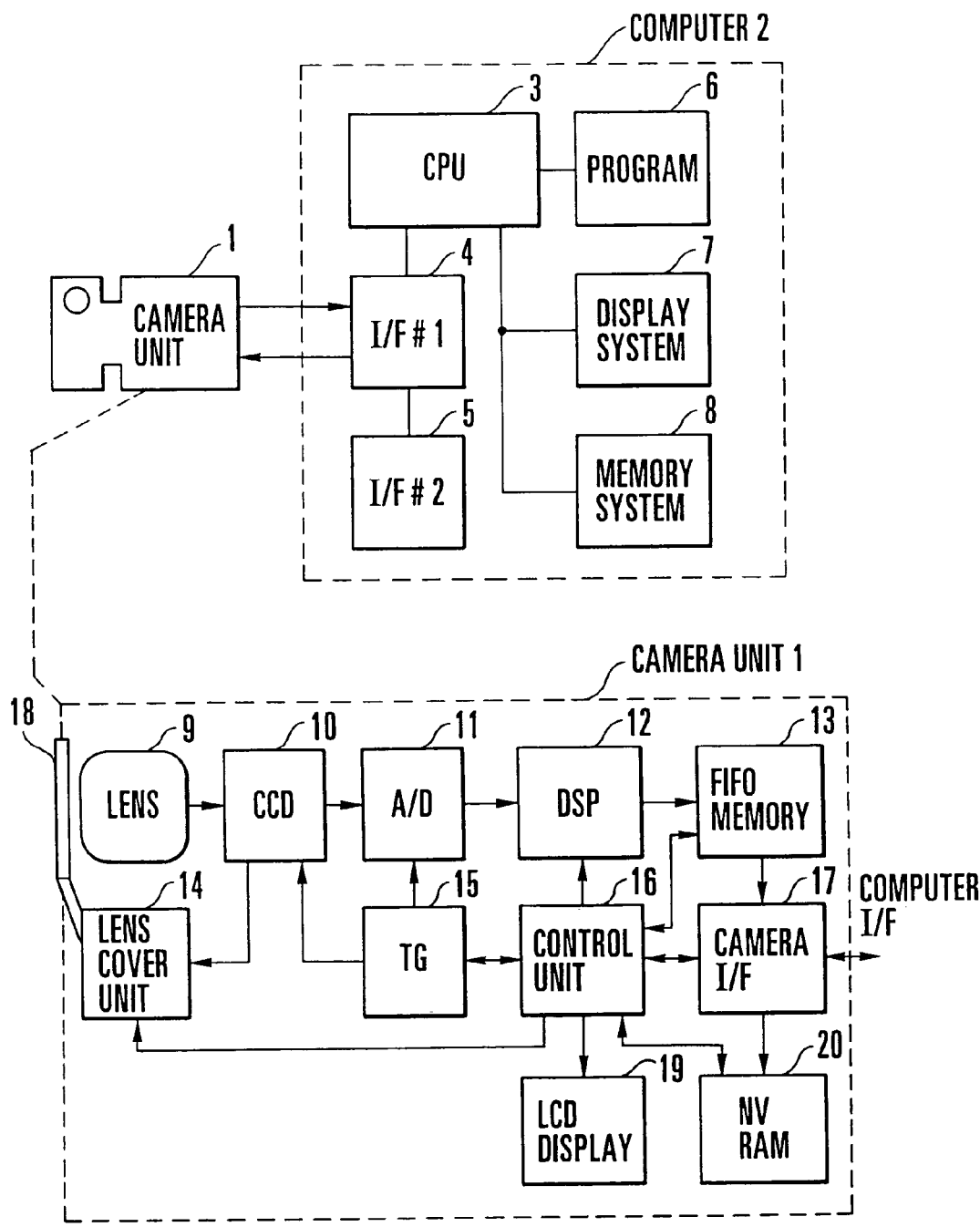
FIG. 2 is a block diagram showing the arrangement of an image pickup system which is arranged according to this invention as a first embodiment thereof.

Referring to FIG. 2, reference numeral 1 denotes an image pickup unit (camera unit) and reference numeral 2 denotes a computer for performing image processing. The computer 2 includes a CPU unit 3, connection terminals 4 and 5, an operation program memory 6 having stored therein a program for the operation of the CPU unit 3, a display system 7, and a memory system 8. The image pickup unit 1 includes a lens optical system (lens) 9, a CCD unit 10, an A/D converter 11, a digital signal processing device (DSP) 12, an FIFO memory 13, a lens cover driving unit 14, a timing signal generator (TG) 15 for the CCD unit 10, the A/D converter 11, etc., a control unit 16 for controlling the operation of the image pickup unit 1, an interface (camera I/F) 17 for external connection, a lens cover 18, a liquid crystal display (LCD display) 19 for displaying information of varied kinds, and a nonvolatile memory (NV RAM) 20.

In FIG. 2, an image pickup system is used by connecting the interface 17 of the image pickup unit 1 to the connection terminal 4 of the computer 2. Although the shape of the connection terminal 5 is the same as that of the connection terminal 4, the connection terminal 5 is arranged to inhibit the image pickup unit 1 from being mechanically connected or at least from being electrically connected thereto.

When the image pickup unit 1 is connected to the connection terminal 4, electric power is supplied to the image pickup unit 1 through the connection terminal 4. The control unit 16 then begins to operate. The CPU unit 3 detects through the connection terminal 4 that the image pickup unit 1 is connected to the computer 2.

Figure 3:
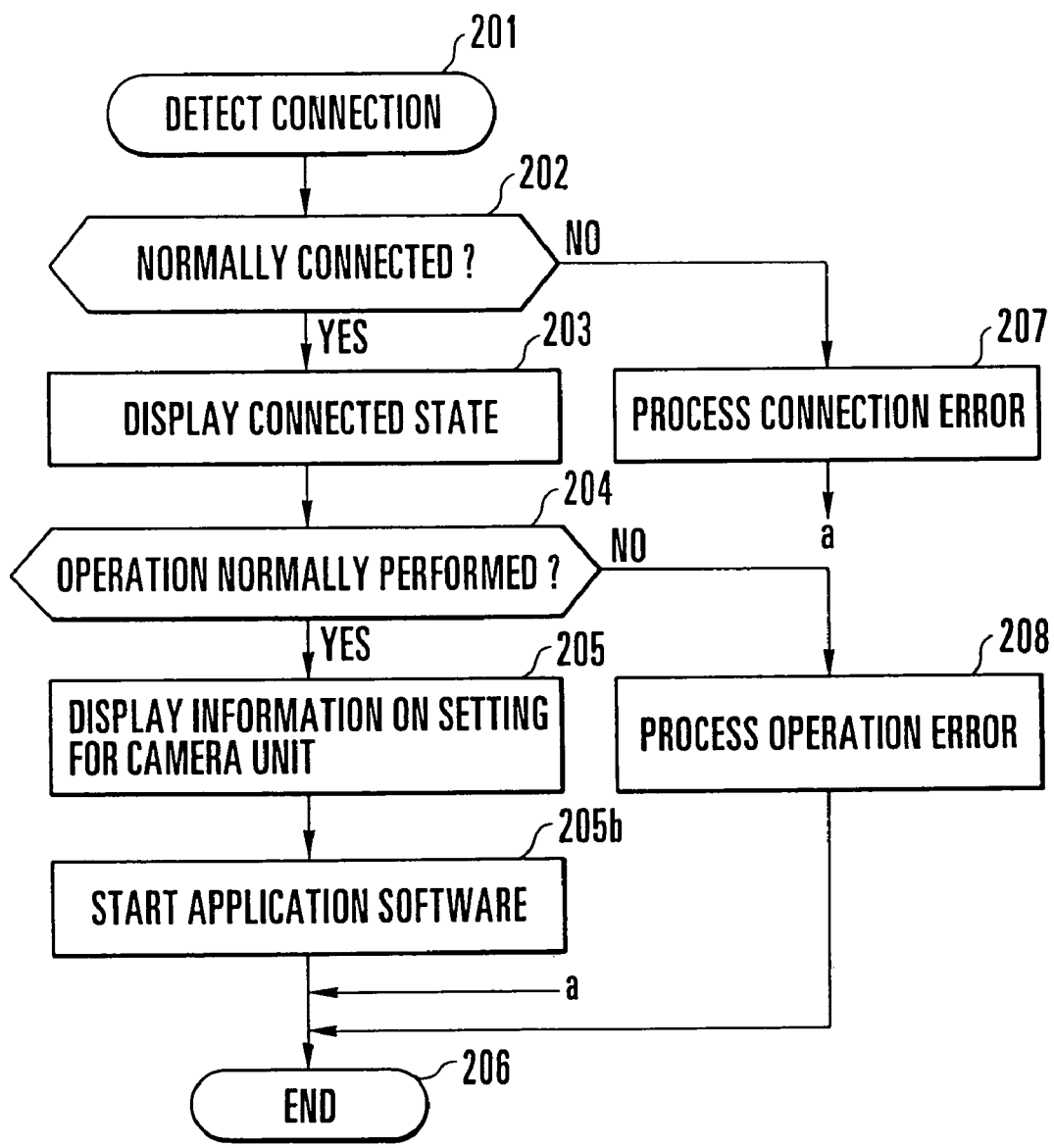
FIG. 3 is a flow chart showing processes to be executed by the image pickup system which is the first embodiment of this invention.
Figure 4:
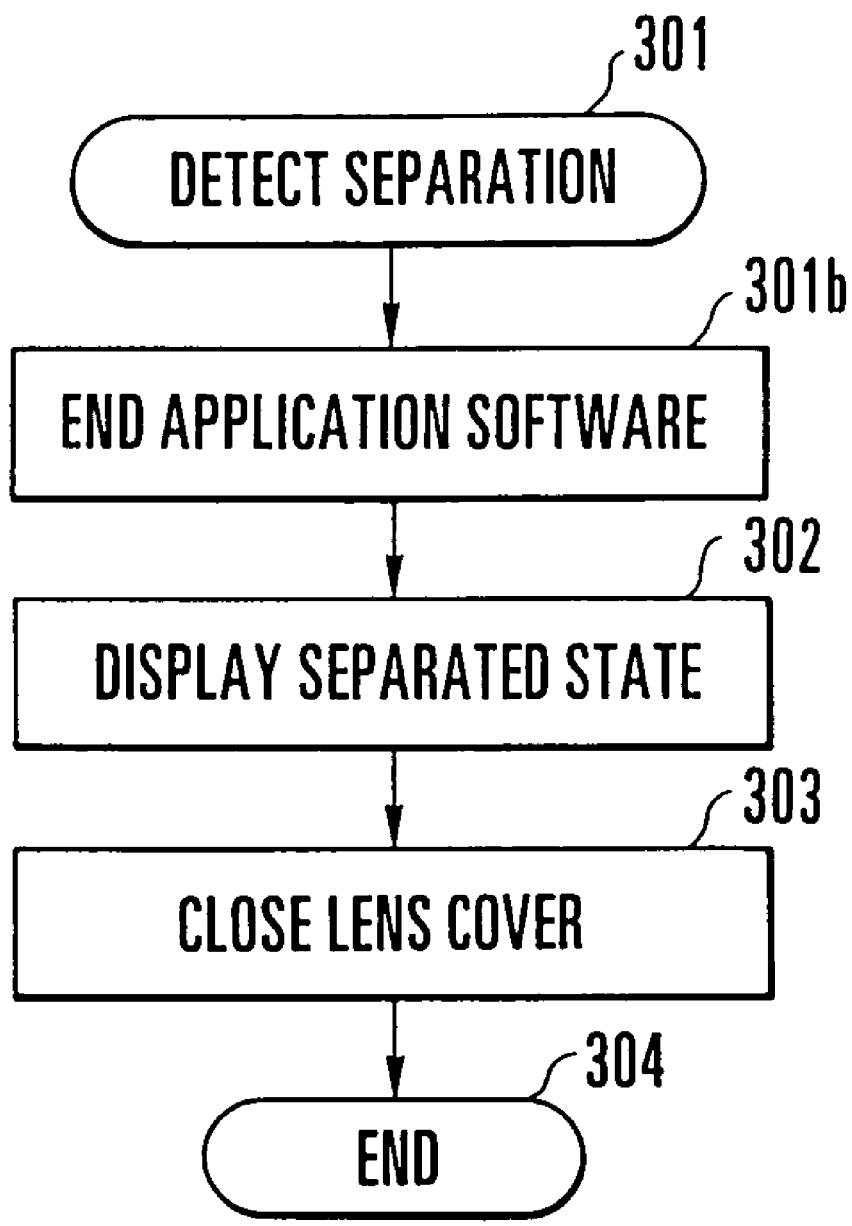
FIG. 4 is a flow chart showing processes to be executed by the image pickup system when an image pickup unit is found to have been separated from a connection terminal.
Figure 5:
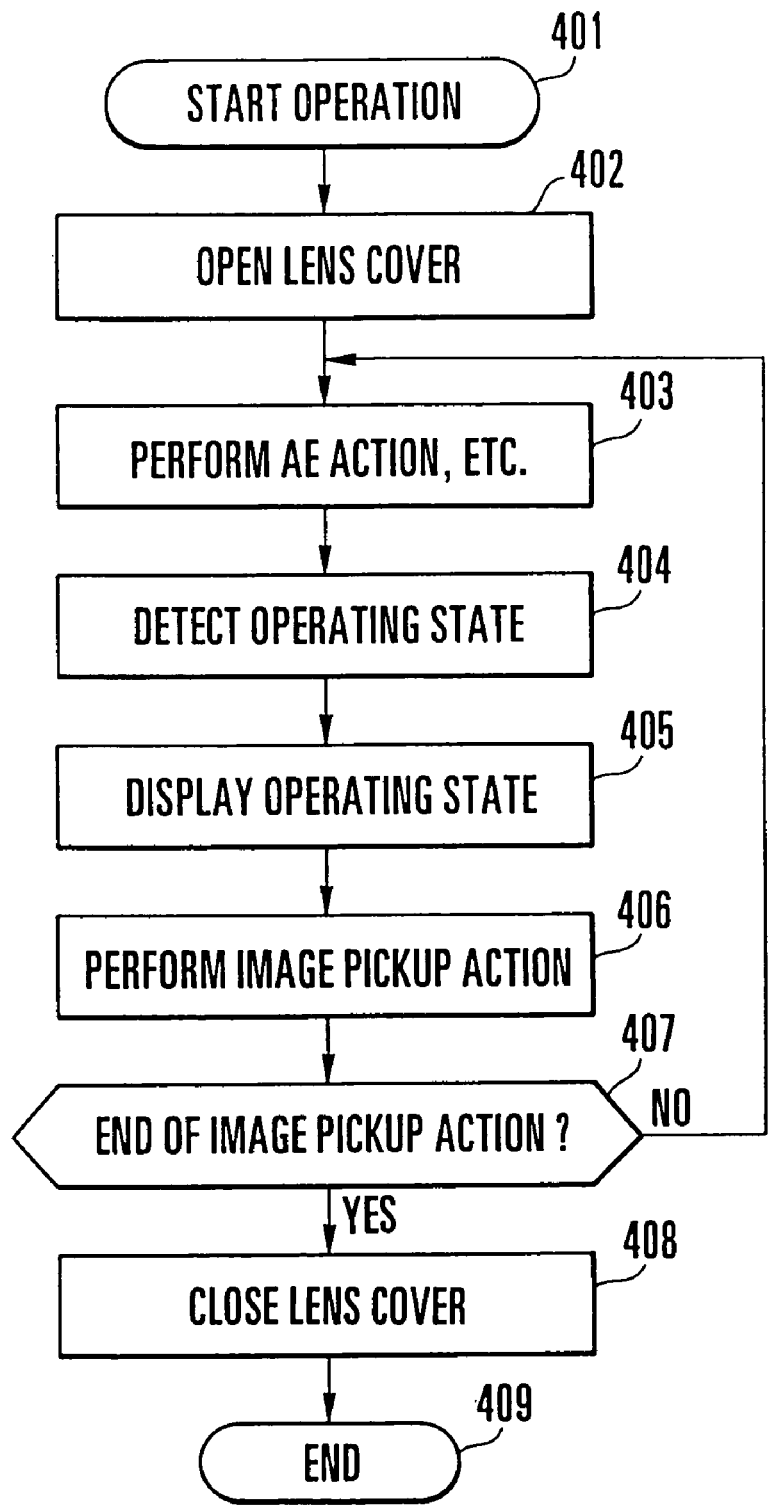
FIG. 5 is a flow chart showing processes to be executed by the same image pickup system when an instruction is given according to an operation program to perform an image pickup action by using the image pickup unit.

Upon detection of the connected state, the image pickup system performs processes as shown in FIG. 3. Further, upon detection of the fact that the image pickup unit 1 is separated from the connection terminal 4, the image pickup system performs processes as shown in FIG. 4. When an instruction for performing an image pickup action with the image pickup unit 1 is given by an operation program stored in the operation program memory 6, the image pickup system performs processes as shown in FIG. 5.

The flows of the above-stated processes are described below with reference to FIGS. 3, 4 and 5.

(i) Upon Detection of Connection (FIG. 3)

At a strep 201, when an arbitrary device unit, which is assumed to be the image pickup unit 1 in this case, is connected to the connection terminal 4, the connection terminal 4 sends a connection signal to the CPU unit 3, so that the CPU unit 3 detects that the image pickup unit 1 is connected to the computer 2.

At a step 202, the CPU unit 3 sends out, via the connection terminal 4, a test signal S2A to the control unit 16. The test signal S2A sent from the CPU unit 3 to the control unit 16 is a request for a check for the initial state of the image pickup unit 1. Upon receipt of the test signal S2A, the control unit 16 makes a check for the state of electric power supplied from the computer 2, etc., in a manner which will be described later, so as to find if the connection is normally made. If so, the control unit 16 sends a signal S2B to the CPU unit 3, indicating that the image pickup unit 1 is adequately connected to the computer 2. If not, the control unit 16 sends a signal S2C to the CPU unit 3, indicating that the image pickup unit 1 is not adequately connected to the computer 2.

In the event of an attempt to connect the image pickup unit 1 to the other connection terminal 5, instead of the terminal 4, the CPU unit 3 cannot receive the signal S2B nor the signal S2C and the connection cannot be made in a normal manner because, although the connection terminal 5 is in the same shape as the connection terminal 4, the connection terminal 5 is incapable of connecting the image pickup unit in terms of signals in this case.

Upon receipt of the signal S2B, the CPU unit 3 makes a check for confirmation of the normal connection. The signal S2B carries intrinsic data of the image pickup unit 1 indicating a serial number, a manufacturer's name, etc. Such data is written (in a manner not reloadable) in the ROM which is disposed within the control unit 16.

The signal S2B thus enables the CPU unit 3 to find the intrinsic data of the image pickup unit 1 and also to know to which of the plurality of connection terminals of the computer 2 the image pickup unit 1 is connected.

If the connection is normally made, the flow comes to a step 203. If not, the flow comes to a step 207.

At the step 203, the CPU unit 3 causes the display system 7 to provide a display indicating that the connection is normally made. The control unit 16 also causes the liquid crystal display 19 to provide a display indicating that the connection is normally made. These actions enable the operator of the image pickup system to know that the connection is made in a normal manner.

At a step 204, the control unit 16 makes a check for the initial states of devices other than the control unit 16 included in the image pickup unit 1. The result of the check is sent out to the CPU unit 3 through the connection terminal 4. In this instance, if a result of the check indicates no abnormality in the devices included in the image pickup unit 1, the control unit 16 sends to the CPU unit 3 a signal S2D which indicates that there is no abnormality in the image pickup unit 1, and the flow comes to a step 205. If the result of the check indicates some abnormality, the control unit 16 sends a signal S2E which indicates that there is some abnormality in the image pickup unit 1, and the flow comes to a step 208.

In the image pickup system, data of shooting conditions previously used is recorded in the nonvolatile memory 20 of the image pickup unit 1. The previous shooting conditions remain unchanged unless they are changed by the CPU unit 3.

Further, in the image pickup system, the operating state of the image pickup unit 1 obtained at the time of the previous shooting is recorded in the memory system 8 along with picked-up image data. It is possible to cause the image pickup unit 1 to operate in the same state as the state obtained at the time of the previous shooting by using this record.

Decision as to whether the recorded previous operating state of the image pickup unit 1 is to be employed or the operating state of the image pickup unit is to be newly decided has already been made either by the operation program memory 9 or by the operator of the image pickup system.

At the step 205, the control unit 16 sends to the CPU unit 3 a signal S2F which represents the data of shooting conditions of the image pickup unit 1 including a number of picture frames per unit time (a frame speed), a number of colors in use, numbers of vertical and horizontal picture elements per frame, an amount of information carried by one picture element, etc.

Upon receipt of the signal S2F, the CPU unit 3 causes the display system 7 to display information on the above-stated data according to the signal S2F. The control unit 16 also causes the information to be displayed on the liquid crystal display 19. The displays enable the operator of the image pickup system to know the shooting conditions and the details of an operation of the image pickup unit 1.

At a step 205b, the CPU unit 3 starts an application software, such as video capture software and album software, for processing and utilizing picked-up image data transmitted from the image pickup unit 1 which is connected to the computer 2. The application software to be started may be automatically selected by the CPU unit 3 or may be specified by the operator of the image pickup system. Further, an operation of the application software may or may not contain a sequence shown in FIG. 5.

At a step 206, the flow of the processes to be executed when the connection is detected comes to an end.

If the signal S2B is not detected or if the signal S2C is detected at the step 202, the flow comes to the step 207 to perform a connection error processing action. In other words, the abnormal state of connection is displayed at the display system 7 of the computer 2 and on the liquid crystal display 19 of the image pickup unit 1. The step 207 may be arranged to inform the operator of the abnormal state of connection, for example, with some suitable sound such as beep.

If the signal S2D is not detected or if the signal S2E is detected at the step 204, the flow comes to the step 208 to perform an operation error processing action. At the step 208, the operator is informed that the image pickup unit 1 is inoperative as the image pickup unit 1 is out of order. This state is displayed on the liquid crystal display 19 of the image pickup unit 1 and also by the display system 7 of the computer 2.

(ii) Upon Detection of Separation of the Image Pickup Unit

The processes to be executed by the image pickup system when the image pickup unit is found to have been separated are described with reference to FIG. 4.

At a step 301, irrespective of the action of the image pickup unit 1, the connection terminal 4 sends a separation signal S3A to the CPU unit 3 indicating that the image pickup unit 1 is separated from the computer 2, when the image pickup unit 1 is detached from the connection terminal 4. The CPU unit 3 then detects that the image pickup unit 1 is separated from the connection terminal 4.

Electric power to be used by the image pickup unit 1 is supplied from the computer 2. When the image pickup unit 1 is separated from the computer 2, the control unit 16 detects a drop of voltage and thereby detects the separated state.

Even if the image pickup unit 1 is not separated, the image pickup unit 1 acts in the same manner as at the time of separation, in the event of stoppage of the operation of the computer 2 caused by some accident with respect to the supply of electric power. A capacitor is connected in parallel to the power supply circuit of the image pickup unit 1. The capacitor enables the image pickup unit 1 to remain operative for a period of several seconds in the event of stoppage of the supply of electric power from the computer 2.

At a step 301b, the application software, which has been started at the step 205b shown in FIG. 3, is brought to an end.

At a step 302, the CPU unit 3 causes the display system 7 to provide a display indicating that the image pickup unit 1 is separated from the connection terminal 4. If any program that includes use of the image pickup unit 1 is in process of being executed, the program is stopped from being executed. The control unit 16 causes the liquid crystal display 19 to display also the separated state mentioned above.

At a step 303, upon detection of the separated state, the control unit 16 sends a control signal to the lens cover driving unit 14 to cause the lens cover driving unit 14 to close the lens cover 18. If the lens cover 18 has already been closed, no action is performed by the lens cover driving unit 14.

At a step 304, the flow of processes to be executed upon detection of separation of the image pickup unit 1 comes to an end.

(iii) In Performing an Image Pickup Action

The processes to be executed by the image pickup system before and after an image pickup action are as described below with reference to the flow chart of FIG. 5.

At a step 401, the flow of processes begins. The CPU unit 3 sends to the control unit 16 a control signal S4A which indicates the commencement of an image pickup action of the image pickup unit 1. At a step 402, upon receipt of the control signal S4A, the control unit 16 sends a signal to the lens cover driving unit 14 to cause the lens cover 18 to be opened. This action enables the lens 9 to pick up images. At a step 403, the control unit 16 causes the CCD 10, the A/D converter 11 and the DSP (digital signal processing device) 12 to operate to measure a quantity of light incident on the lens 9 and perform an automatic exposure (AE) action. At a step 404, the control unit 16 then sends the signal S2F (see the step 205) to the CPU unit 3.

At a step 405, the CPU unit 3 uses the signal S2F to cause the display system 7 to display the operating state of the image pickup unit 1. The control unit 16, on the other hand, causes the liquid crystal display 19 to display the same operating state. These displays enable the operator of the image pickup system to know the shooting conditions of the image pickup unit 1 and the details of the operation of the image pickup unit 1.

At a step 406, image light incident on the lens 9 forms an image on the CCD 10. The CCD 10 accumulates electric charge corresponding to the image. The electric charge is read out by the A/D converter 11. The electric charge accumulating time per frame is determined by the action of the step 403. Picked-up image data thus obtained from the A/D converter 11 is processed by the DSP 12. The processed data is stored temporarily at the FIFO memory 13. The picked-up image data stored is aerially read out from the FIFO memory 13 according to the speed of data transmission from the camera interface 17 and the connection terminal 4 and is then transmitted to the CPU unit 3. The electric charge accumulating time of the CCD 10 and the action of the A/D converter 11 are controlled by the timing signal generator 15. The timing signal generator 15, the DSP 12, the FIFO memory 13 and the camera interface 17 are controlled by the control unit 16.

The picked-up image data supplied to the CPU unit 3 is displayed by the display system 7 and is recorded by the memory system, i.e., a recording device, 8. The signal S2F which is obtained at the step 405 is also recorded concurrently with the picked-up image data. The signal S2F is recorded also in the nonvolatile memory 20. The operation of the CPU unit 3, the display method of the display system 7 and the recording method of the memory system 8 are all decided by a predetermined operation program of the operation program memory 6.

At a step 407, a check is made to find if the image pickup action is to be terminated. If so, the CPU unit 3 sends to the control unit 16 a signal S4B which indicates the end of the image pickup action of the image pickup unit 1. Upon receipt of the signal S4B, the control unit 16 brings the image pickup action to an end. At this time, the picked-up image data recorded in the FIFO memory 13 is continuously sent out until it completely disappears from the FIFO memory 13.

If the signal S4B is not detected at the step 407, the flow comes back to execute the step 403. At that time, the actions of the step 403 may be executed after the lapse of a predetermined period of time.

When the signal S4B is detected, the flow comes to a step 408. At the step 408, the control unit 16 sends a control signal to the lens cover driving unit 14 to cause the lens cover 18 to be closed.

At a step 409, the flow of processes executed in performing the image pickup action comes to an end.

(Second Embodiment)

The arrangement and operation of a second embodiment of this invention are about the same as the first embodiment except that the lens cover 18 of the image pickup unit 1 which is shown in FIG. 2 is arranged to operate differently from that of the first embodiment. The operation of the second embodiment is described with reference to FIGS. 2, 4, 6 and 7 as follows.

When the image pickup unit 1 is connected to the connection terminal 4, electric power is supplied to the image pickup unit 1 through the connection terminal 4. The control unit 16 then begins to act. Meanwhile, the CPU unit 3 detects through the connection terminal 4 that the image pickup unit 1 is connected to the computer 2.

Figure 6:
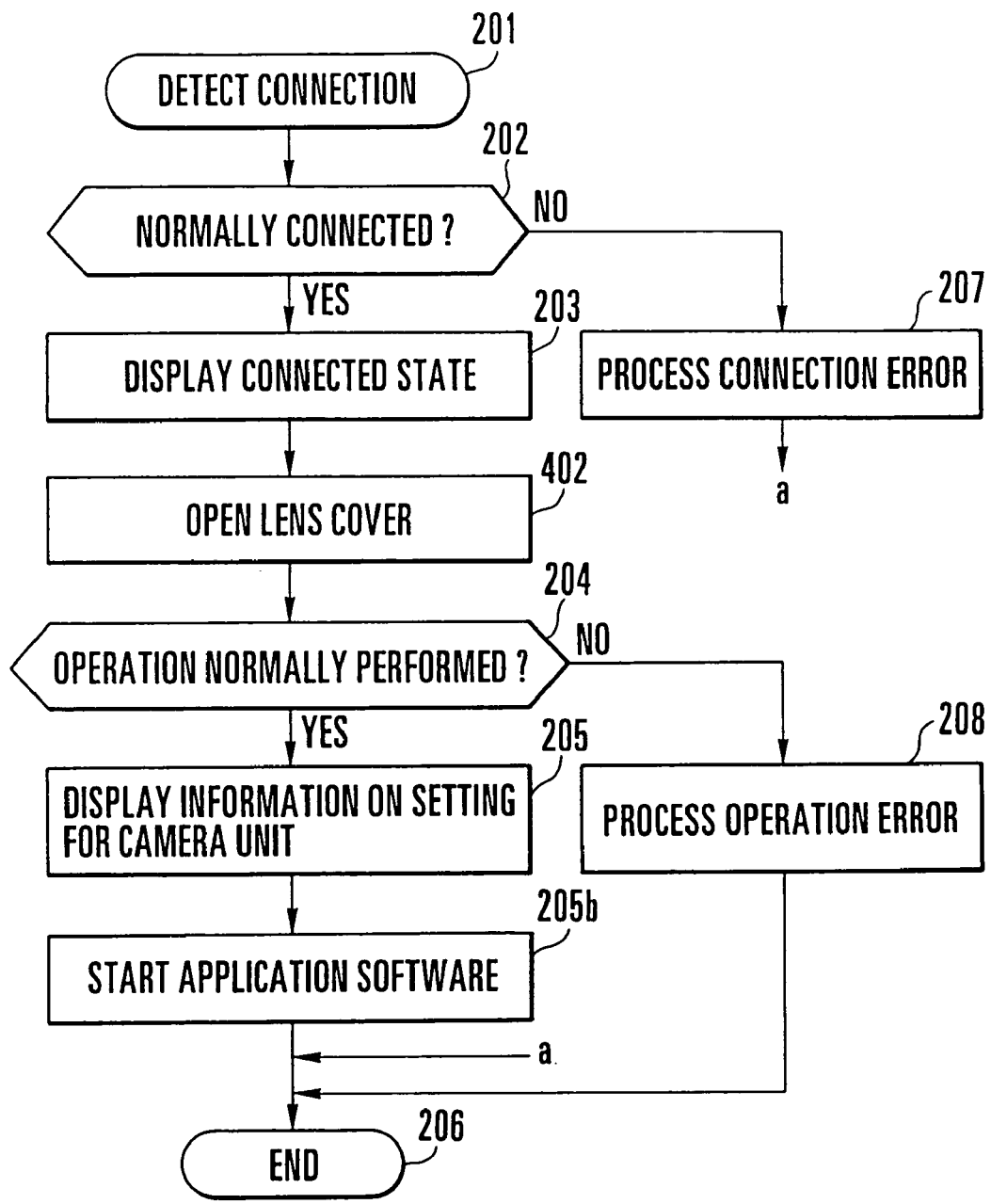
FIG. 6 is a flow chart showing processes to be executed by an image pickup system which is a second embodiment of this invention when an image pickup unit is connected to a computer through a connection terminal.
Figure 7:
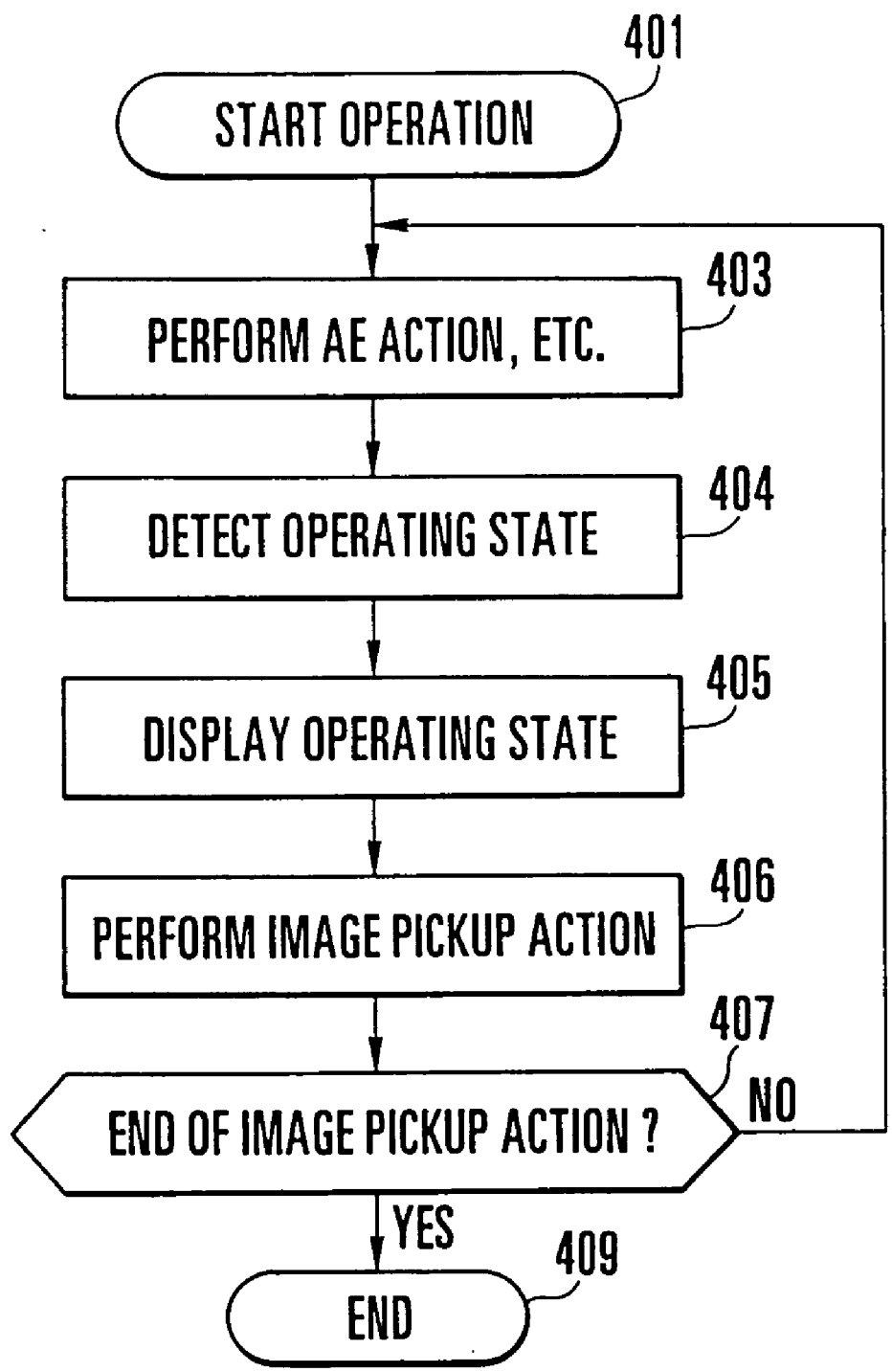
FIG. 7 is a flow chart showing processes to be executed by the image pickup system which is the second embodiment when an instruction is given according to an operation program to perform an image pickup action by using the image pickup unit.

Upon detection of the above-stated connection, the image pickup system which is the second embodiment of this invention begins to operate as shown in FIG. 6. When the image pickup system detects that the image pickup unit 1 is separated from the connection terminal 4, the image pickup system operates as shown in FIG. 4. When an instruction for an image pickup action of the image pickup unit 1 is given by an operation program of the operation program memory 6, the image pickup system operates as shown in FIG. 7.

In the image pickup system of the first embodiment, the lens cover 18 does not open at the time when the image pickup unit 1 is connected to the computer 2 and opens only when an image pickup action begins.

In the image pickup system of the second embodiment, on the other hand, the lens cover 18 opens (at the step 402) at the time when the image pickup unit 1 is connected to the computer 2. Further, the image pickup action is performed totally irrespective of the opening or closing of the lens cover 18, as shown in FIG. 7. The processes to be executed by the second embodiment when the image pickup unit 1 is separated from the computer 2 are the same as in the case of the first embodiment (see FIG. 4).

In the second embodiment, the connection of the image pickup unit 1 to the computer 2<causes the lens cover 18 to open or close. Therefore, the action of the lens cover 18, in the second embodiment, may be arranged to be caused by the mechanical action of the connection terminal 4, instead of being controlled by the control unit 16.

(Third Embodiment)

A third embodiment of this invention relates to the operation of the lens cover 18 to be performed in the arrangement of the first and second embodiments. The following describes by way of example the operation of the lens cover 18 with reference to FIGS. 2, 8 and 9.

Figure 8:
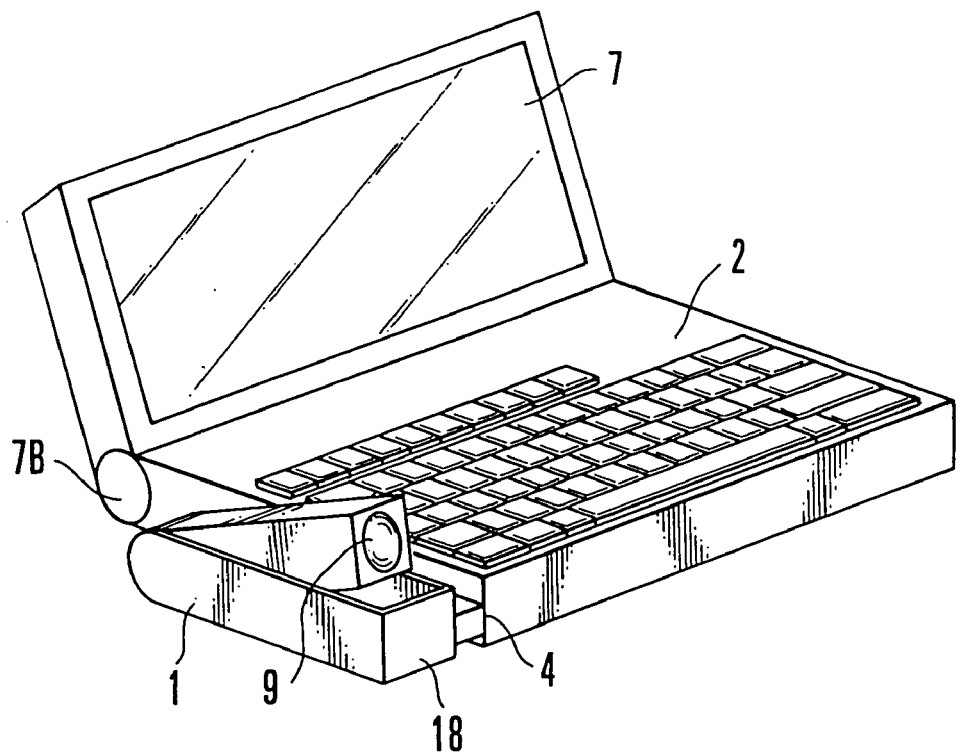
FIG. 8 is an oblique view showing the action of a lens cover in the image pickup system arranged as the first or second embodiment of this invention.

FIG. 8 shows in an oblique view an image pickup system in which the image pickup unit 1 is connected to the computer 2 which is of the lap-top type. Referring to FIG. 8, the image pickup unit 1 is connected to the PCMCIA terminal 4 of the computer 2. The computer 2 is provided with a display system 7 which is a color LCD display having a predetermined angle of visibility. The display system 7 is provided with a hinge part 7B and is thus arranged to permit the operator of the image pickup system to turn the display system 7 to an easily viewable position.

Figure 9:
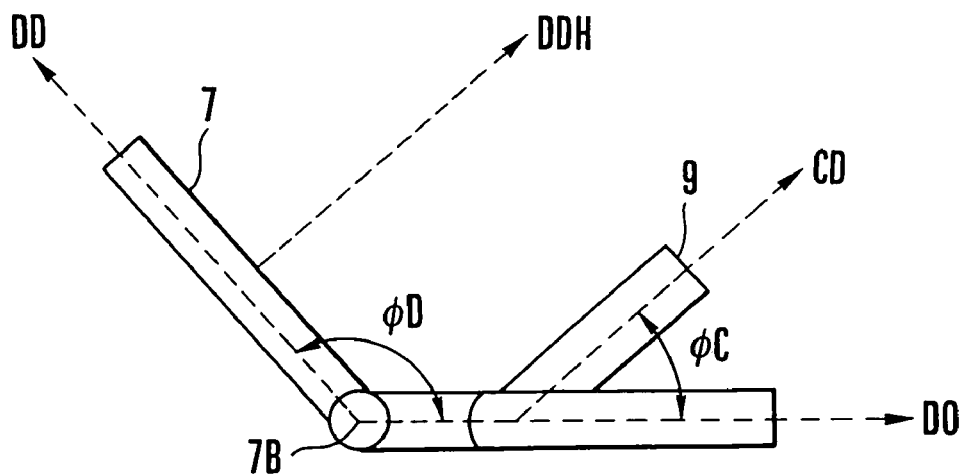
FIG. 9 is a side view showing the action of the lens cover shown in FIG. 8.

FIG. 9 is a side view of the image pickup system shown in FIG. 8.

Referring to FIG. 9, a direction CD indicates a direction in which the lens 9 captures an object of shooting, i.e., the direction of a lens barrel which includes the lens 9. A direction DO is in parallel to a plane on which the computer 2 is set. A display plane direction DD and a direction DDH are always orthogonal to each other.

The directions DO and DD form an angle $\phi D$ which is shiftable within a range of 0 to 180 degrees. Another angle $\phi C$ formed between the directions CD and DO is also shiftable within the range of 0 to 180 degrees.

The lens cover driving unit 14 which is shown in FIG. 2 is arranged to vary the facing direction of the lens 9 as shown in FIG. 9 by means of a motor. In other words, when the angle φC is zero degree, the lens 9 is protected by the lens cover 18. The lens cover 18 does not protect the lens 9 when the angle φC is not zero degree (φC≠0 degree).

At the time of "φC≠0 degree", the CPU unit 3 detects the angle φD through a signal from an angle detecting encoder (not shown) included in the display system 7. The CPU unit 3 then sends a signal to the control unit 16. In response to the signal, the control unit 16 controls the motor (not shown) included in the lens cover driving unit 14 in such a way as to make the directions CD and DDH parallel to each other. Incidentally, the angle φC is zero when the angle φD is less than 90 degrees.

The above-stated action prevents the image pickup unit 1 from performing an image pickup action when the lens 9 is protected by the lens cover 18. When the lens 9 is not protected by the lens cover 18, the image pickup unit 1 is always directed toward a part where the display system 7 is easily viewable, so that the operator of the image pickup system can be captured as an object of shooting by the image pickup unit 1. Meanwhile, the operator of the image pickup system is enabled to know the operating state and the connected state of the image pickup system according to the direction of the lens 9.

Further, the above-described embodiments of this invention produce the following advantages.

Since the function of processing the picked-up image signal formed by the image pickup unit and the function of controlling the image pickup action are arranged to be partly carried out by an external picked-up image signal processing device, the image pickup unit can be configured in a compact size. The image pickup unit therefore can be formed in a card-like shape such as a PCMCIA or the like.

In cases where a picked-up image signal is to be processed by means of a computer or the like, the signal processing method of prior art has necessitated some duplicating part including processes of converting the picked-up image signal first into a signal of a TV format such as the format of the NTSC system and then into a digital signal for the computer. The above-described embodiments, on the other hand, can be arranged without any wasteful part.

Further, according to the above-described embodiments, the image pickup function can be simply added to an external signal processing device, such as the computer. Besides, the arrangement according to this invention permits optimum control according to both the state of the computer and that of the image pickup unit.

It is a particularly advantageous feature of the embodiments that information of the image picking-up state of the image pickup unit, such as whether or not the lens cover is closed, which image pickup mode is selected, etc., can be received, recorded and displayed on the part of an external image signal processing device such as the computer, so that an image pickup system can be arranged according to this invention to have excellent operability.

(Fourth Embodiment)

Figure 10:
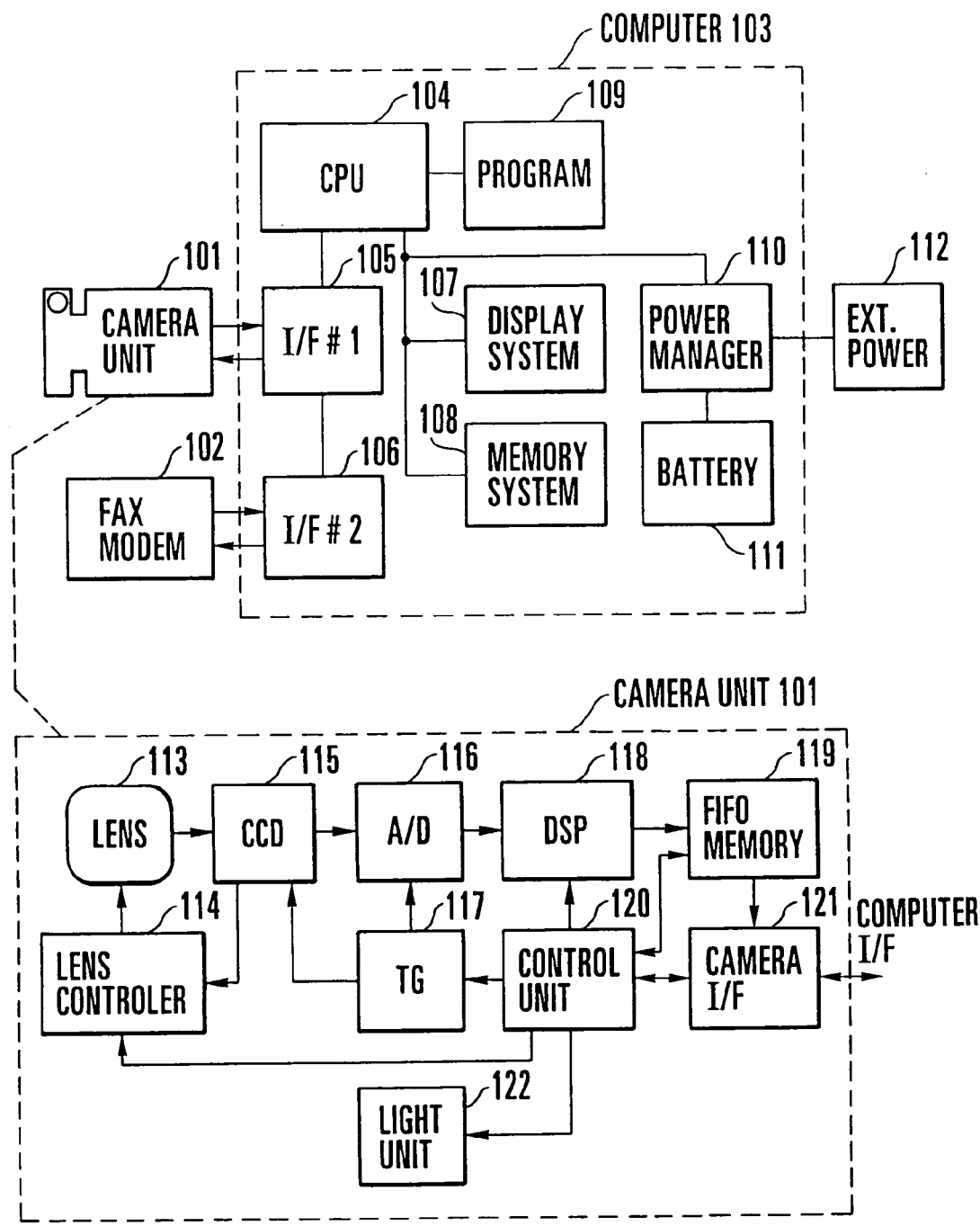
FIG. 10 is a block diagram showing the arrangement of a fourth embodiment of this invention.

FIG. 10 shows in a block diagram an image pickup system which is arranged as a control system according to a fourth embodiment of this invention.

Referring to FIG. 10, reference numeral 101 denotes an image pickup unit having contained therein an optical system, etc., and reference numeral 102 denotes a fax card having a facsimile (fax) function. The image pickup unit 101 and the fax card 102 are employed by way of example as device units. Reference numeral 103 denotes a computer employed as a control device. The computer 103 includes a CPU 104, a first interface (I/F #1) 105 which is arranged to connect the image pickup unit 101 to the computer 103, a second interface (I/F #2) 106 which is arranged to connect the fax card 102 to the computer 103, a display system 107, a memory system 108, a reloadable operation program memory 109 arranged to control the computer 103, a power manager system 110, and a battery 111. Reference numeral 112 denotes an external power supply device which is capable of supplying electric power to the computer 103.

In FIG. 10, a part encompassed with a broken line to include blocks indicated with reference numerals 113 to 121 shows the internal arrangement of the image pickup unit 101. The image pickup unit 101 includes a lens 113, a lens controller 114 which is arranged to drive the lens 113 and includes a known automatic focusing device and a known automatic image stabilizing (image-shake preventing) device, a CCD 115, an A/D converter 116, a timing signal generator (TG) 117, a digital signal processing device (DSP) 118, an FIFO memory 119, a control unit 120, an interface for external connection (camera I/F) 121, and a light unit 122 which is arranged to illuminate an object of shooting and to be controlled by the control unit 120.

In the case of the fourth embodiment shown in FIG. 10, the image pickup system is composed of the image pickup unit 101, the fax card 102 and the computer 103. The image pickup unit 101 and the fax card 102 are arranged to be separable from the computer 103.

The object of shooting is imaged on the CCD 115 through the lens 113 and is then converted into digital data by the A/D converter 116. The digital image data is processed by the DSP 118. The processed data is recorded temporarily at the FIFO memory 119. After that, the data is serially sent out to the computer 103 from the FIFO memory 119 through the camera interface (I/F) 121 in the order of recording. The camera interface 121 is connected to the first interface (I/F #1) 105 of the computer 103.

The picked-up image data is obtained from the CCD 115 and the A/D converter 116 according to timing pulses sent out from the TG 117. The sending-out intervals of the timing pulses from the TG 117 are controlled by the control unit 120. Depending on conditions under which images are to be picked up, the control unit 120 actuates the light unit 122 to illuminate the object. The control unit 120 controls the circuits 114, 117, 118, 119 and 122 according to signals sent from the computer 103 through the camera interface 121.

Referring to FIG. 10, picked-up image data obtained by the image pickup unit 101 is sent to the computer 103 through the interface 105. The image data then can be displayed on the display system 107 or recorded in the memory system 108. It is also possible to send the picked-up image data to the fax card 102 through the interface 106 for transmission through a telephone line.

The computer 103 supplies electric power to each of the device units 101 and 102 connected thereto. The CPU 104 is arranged to determine, through the interfaces 105 and 106, the allocation of electric power to be supplied to the device units 101 and 102.

Further, the CPU 104 is capable of controlling, through the interfaces 105 and 106, the amounts of allocation of electric power being supplied to the device units 101 and 102 connected to the computer 103. In this instance, the amount of allocation of electric power supplied to the image pickup unit 101 is assumed to be P1, and the amount of allocation of electric power supplied to the fax card 102 is assumed to be P2. When the device unit, i.e., the image pickup unit 101 or the fax card 102, is not connected to the computer 103, the amount of electric power P1 or P2 is zero.

The amount of electric power consumed by the image pickup unit 101 is assumed to be U1, and the amount of electric power consumed by the fax card 102 is assumed to be U2. The amounts of electric power U1 and U2 are detected by the CPU 104 through the interfaces 105 and 106. The CPU 104 monitors through the power manager system 110 the amount of electric power UC being used by the computer 103, the amount of electric power PB being supplied from the battery 111 and the amount of electric power PE being supplied from the external power supply 112. The amount of electric power PE is zero if the external power supply 112 is not connected. The amount of electric power PB constantly decreases. In a case where the external power supply 112 is a battery, the amount of electric power PE also constantly decreases. The values of the amounts of electric power are defined as PM=PB+PE, wherein the value PM represents a maximum amount of electric power usable by the computer 103 and the device units 101 and 102 connected to the computer 103.

The timing for monitoring each of the amounts of electric power U1, U2, UC, PB and PE is set according to a predetermined operation program of the operation program memory 109. Further, the power manager system 110 is arranged to be capable of variably controlling the amounts of electric power being used by the display system 107 and the memory system 108. For example, if the display system 107 used by the computer 103 is a liquid crystal display having a back light, the amount of electric power to be used by the display system 107 can be varied by lighting up or putting out the back light. The amount of electric power UC is thus variable by such control.

With the image pickup system configured in the above-stated manner, when the image pickup unit 101 and the fax card 102 are connected for their operations or when a change in the amount of electric power PB or PE is forecast, an operation of allocating electric power and selecting a power saving mode is performed in a manner as described below. By virtue of this operation, a total amount of electric power to be used by the image pickup unit 101, the computer 103 and the fax card 102, i.e., "UC+U1+U2", can be effectively prevented from exceeding the maximum amount PM of electric power. Further, the allocation of electric power is made in a manner suited for a desired operation of the image pickup system.

Figure 11:
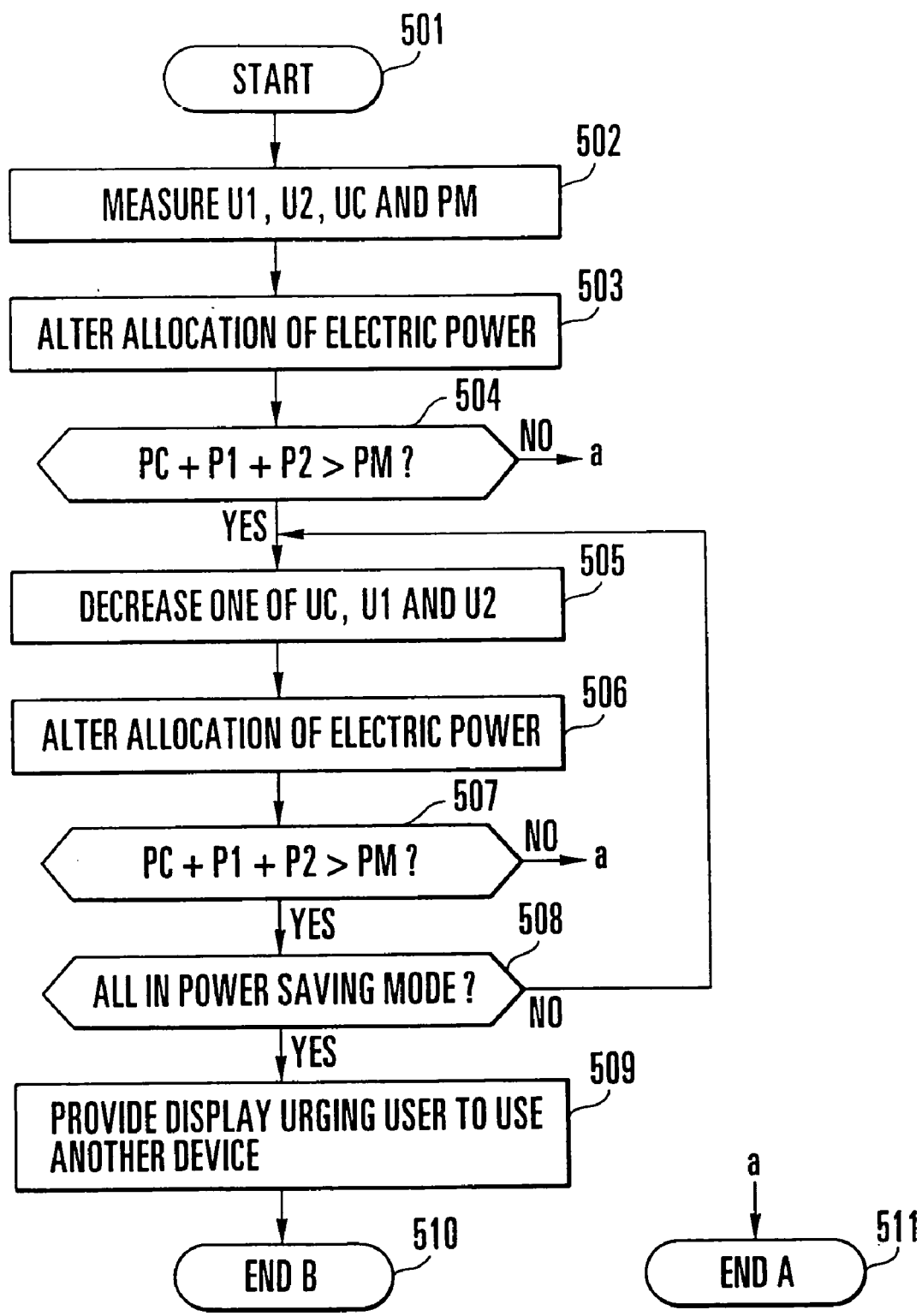
FIG. 11 is a flow chart showing an operation of the fourth embodiment of this invention.

FIG. 11 is a flow chart showing the allocation of electric power and the method of selecting a power saving mode in the image pickup system according to the fourth embodiment of this invention. In the case of this flow chart, the allocating and selecting operation is carried out by the computer 103. However, this operation may be carried out on the side of the device unit. The flow of operation, or an algorithm, of the fourth embodiment is described with reference to FIGS. 10 and 11.

The algorithm starts at a step 501.

At a step 502, the amounts of electric power U1, U2, UC and PM are measured.

At a step 503, a predicted amount of electric power required for the use of the image pickup unit 101 is assumed to be U1$i$, a predicted amount of electric power required for the use of the fax card 102 is assumed to be U2$i$, and a predicted amount of electric power required for varying an action of the computer 103 is assumed to be UC$i$. Depending on the values of the predicted amounts of electric power U1$i$, U2$i$ and UC$i$ and the measured amounts of electric power U1, U2 and UC, the amounts of allocation of electric power P1, P2 and PC are altered respectively to the amounts. U1$i$, U2$i$ and UC$i$. If the values of the amounts of electric power P1, P2 and PC are expected not to vary, the amounts of electric power P1, P2 and PC are not altered.

In a case where it is impossible to predict or forecast the amounts of electric power UC$i$, U1$i$ and U2$i$, the amounts of electric power P1, P2 and PC are respectively set at the values of the amounts U1, U2 and UC.

At a step 504, a check is made to find if there is any problem with the values of the amounts of allocation of electric power P1, P2 and PC. In other words, these values are examined to find if they are in a relation "PC+P1+P2>PM", which presents a problem and is not acceptable. If so, the flow comes to a step 505. If not, the flow comes to a step 511.

At the step 505, in order to decrease one of the values of the amounts of electric power U1, U2 and U3, the operation mode of one of the image pickup unit 101, the computer 103 and the fax card 102 is changed to a power saving mode. Which of the amounts of electric power U1, U2 and UC is to be decreased is determined according to either the intention of the operator or the operation priority programmed beforehand. For example, assuming that the operation priority is programmed to give higher priority in the order of the image pickup unit 101, the computer 103 and the fax card 102, they are set into the power saving mode one by one in such a way as to reduce the amounts of electric power in the order of U2, UC and U1.

At a step 506, the amounts of allocation of electric power are again altered in the same manner as at the step 503.

At a step 507, a check is made in the same manner as at the step 504 to find if there is any problem with the values of the new amounts of allocation of electric power P1, P2 and PC. If so, the flow of operation proceeds to a step 508.

At the step 508, a check is made to find if the operating modes of all the image pickup unit 101, the computer 103 and the fax card 102 have come into the power saving mode. If so, the flow proceeds to a step 509. If not, the flow comes back to the step 505.

At the step 509, since a load imposed by the operation of the image pickup system is considered too large for the amount of electric power available for the image pickup system, a display is provided to urge or recommend the operator either to give up the currently intended operation or to use another available device unit.

At a step 510, with a load imposed by the operation of the image pickup system considered too large for the available amount of electric power, the flow of processes is brought to an end.

At the step 511, the allocation of electric power and the setting of the power saving mode are considered to have been adequately executed, and the flow is brought to an end.

PRACTICAL EXAMPLE 1

A practical example 1 of the processes of FIG. 11 is described with reference to FIGS. 11 and 12 as follows.

Figure 12:
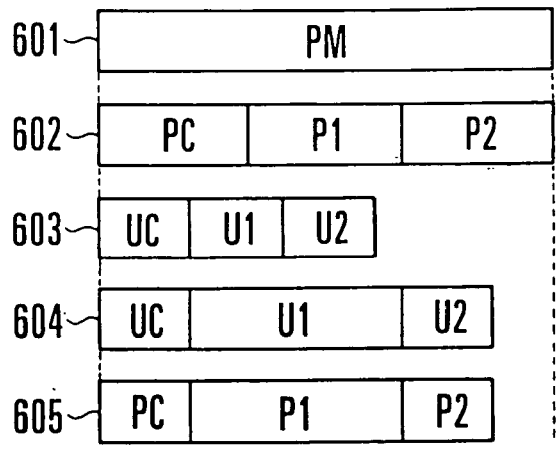
FIG. 12 shows a first practical example of the action of the fourth embodiment of this invention.

In FIG. 12, bars 601 to 605 represent amounts of electric power. The longer the bar is, the larger the amount of electric power. It is assumed that, in the initial state of the image pickup system, the image pickup unit 101 is not performing any image pickup action and the fax card 102 is not acting, although they are connected to the computer 103. Then, the image pickup system performs an image pickup action using the image pickup unit 101. The fax card 102 is not used then. The operation priority-mentioned in the description of the step 505 is thus in the order of "the image pickup unit 101—the computer 103—the fax card 102".

In the initial state, the amounts of electric power PM, UC, U1 and U2 are assumed to be as represented by bars 601 and 603 in FIG. 12. The bar 602 shows the amounts of allocation of electric power P1, P2 and PC set in the initial state. In the case of this example, the computer 103 is assumed to be not predicting the amount of electric power U1$i$ to be used by the image pickup unit 101 for the current image pickup action. The image pickup action is performed without altering the amounts of allocation of electric power P1, P2 and PC beforehand. A bar 604 shows how the amounts of electric power UC, U1 and U2 are changed by the image pickup action. The values of the amounts UC, U1 and U2 are measured at the step 502.

Comparing the bar 602 with the bar 604, the amount U1 is larger than the amount P1. Therefore, the amount of allocation of electric power P1 is increased at the step 503. With the amount P1 increased, the new amounts of allocation of electric power P1, P2 and PC are as represented by the bar 605.

Then, a check is made, at the step 504, to find if there is any problem with the new amounts of allocation of electric power. However, since the amount of electric power PM is larger than the total of amounts "PC+P1+P2" as shown by the bar 605, there is no problem. Therefore, the flow of processes comes to an end in a normal state at the step 511 to allow the image pickup action to be performed.

In the case of the practical example 1, the power saving mode does not have to be set for the image pickup action. Upon completion of the image pickup action, the computer 103 brings the amounts of allocation of electric power P1, P2 and PC back to the initial setting values shown at the bar 602.

PRACTICAL EXAMPLE 2

A practical example 2 of the processes of FIG. 11 is described with reference to FIGS. 11 and 13 as follows.

In the same manner as the practical example 1, the image pickup unit 101 is not performing any image pickup action and the fax card 102 is not acting although they are connected to the computer 103, in the initial state. Then, the image pickup system performs an image pickup action using the image pickup unit 101. The fax card 102 is not used then. The operation priority mentioned above in the description of the step 505 is, therefore, in the order of "the image pickup unit 101—the computer 103—the fax card 102", in the same manner as in the practical example 1.

However, in the case of the practical example 2, the steps 501 to 511 of FIG. 11 are executed before the image pickup action is actually performed. At the step 503, the values U1$i$, U2$i$ and UC$i$ are predicted. More specifically, the amounts of electric power PM, UC, U1 and U2 measured at the step 502, after the start of the flow of operation at the step 501, are assumed to be as represented by bars 701 and 703 of FIG. 13. A bar 702 of FIG. 13 shows the amounts of allocation of electric power PC, P1 and P2.

The computer 103 predicts an amount of electric power U1$i$ to be used for the current image pickup action by the image pickup unit 101. The amounts of electric power U1$i$, UC and U2 are represented by a bar 704. Comparison of the bars 702 and 704 indicates that the predicted value U1$i$ is larger than the amount of allocation P1 (U1$i$>P1). The amount of allocation P1, therefore, must be increased. With the amount of allocation P1 thus increased, the new amounts of allocation of electric power P1, P2 and PC are-as represented by a bar 705.

The amounts of allocation are checked at the step 504. In this case, the total of the amounts of allocation "PC+P1+P2" is larger than the value PM which is the maximum amount of electric power available. Therefore, the step 505 is executed. In order to decrease the amount of electric power U2 according to the operation priority, the operation mode of the fax card 102 is changed to the power saving mode. The amounts of electric power UC, U1$i$ and U2 obtained with the mode of the fax card changed to the power saving mode are as represented by a bar 706 in FIG. 13. The allocation of amounts of electric power is again altered at the step 506.

Figure 13:
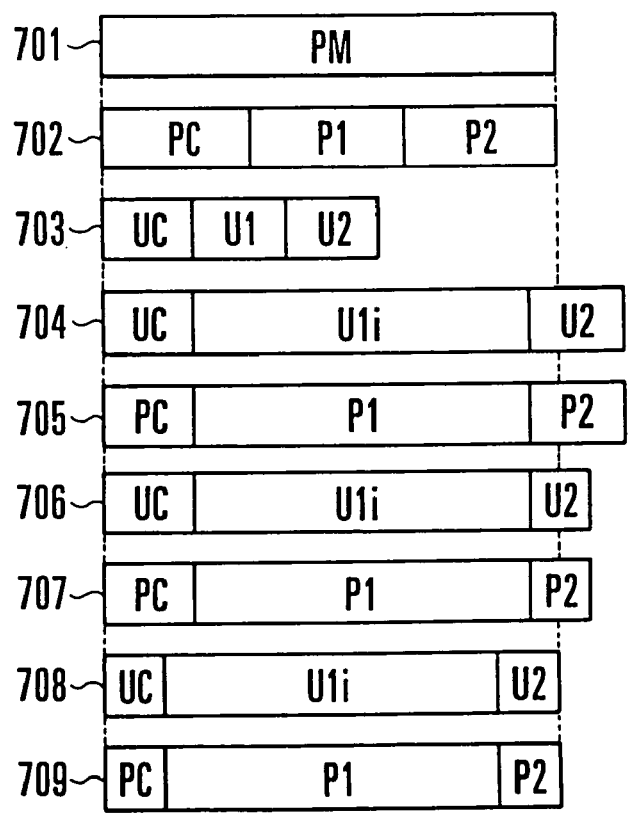
FIG. 13 shows a second practical example of the action of the fourth embodiment of this invention.

The new amounts of allocation of electric power PC, P1 and P2 are as represented by a bar 707 in FIG. 13. The amounts of allocation are checked again at the step 507. The total of the amounts of allocation "PC+P1+P2" is still larger than the value PM. Therefore, the check of the step 508 is made. Since it is only the fax card 102 that is in the power saving mode, the flow of operation comes back to execute the step 505 again. In order to decrease the amount of electric power UC this time according to the operation priority, the mode of the computer 103 is changed over to the power saving mode. With the mode of the computer 103 shifted to the power saving mode, the amounts of electric power UC, U1$i$ and U2 become as represented by a bar 708. Then, at the step 506, the allocation of amounts of electric power is altered. The new amounts of allocation of electric power PC, P1 and P2 thus obtained are as represented by a bar 709 in FIG. 13. The new amounts of allocation are checked at the step 507. In this instance, the allocation of amounts of electric power is no longer in the state of "PC+P1+P2>PM". Therefore, the flow of processes comes to an end in a normal state at the step 511.

In the case of the practical example 2 described above, it is necessary to shift the mode of the fax card 102 and that of the computer 103 to the power saving mode in performing an image pickup action. Upon completion of the image pickup action, the computer 103 brings the amounts of allocation of electric power P1, P2 and PC back to their initial state as represented by the bar 702 in FIG. 13.

(Fifth Embodiment)

A fifth embodiment of this invention is arranged in the same manner as the arrangement of FIG. 10 which shows the fourth embodiment. In the fourth embodiment as described above, the fax card 102 and the computer 103 are arranged to have the power saving mode. In the case of the fifth embodiment, on the other hand, the image pickup unit 101 is arranged to have a plurality of power saving modes while the fax card 102 and the computer 103 have the power saving mode as mentioned in the foregoing.

The following describes how each of the power saving modes of the image pickup unit 101 is selected. The actions to be performed by the image pickup unit 101 in the power saving modes and other modes are described with reference to FIG. 10 and the manner in which each of these modes are selected is described with reference to FIG. 14.

Figure 14:
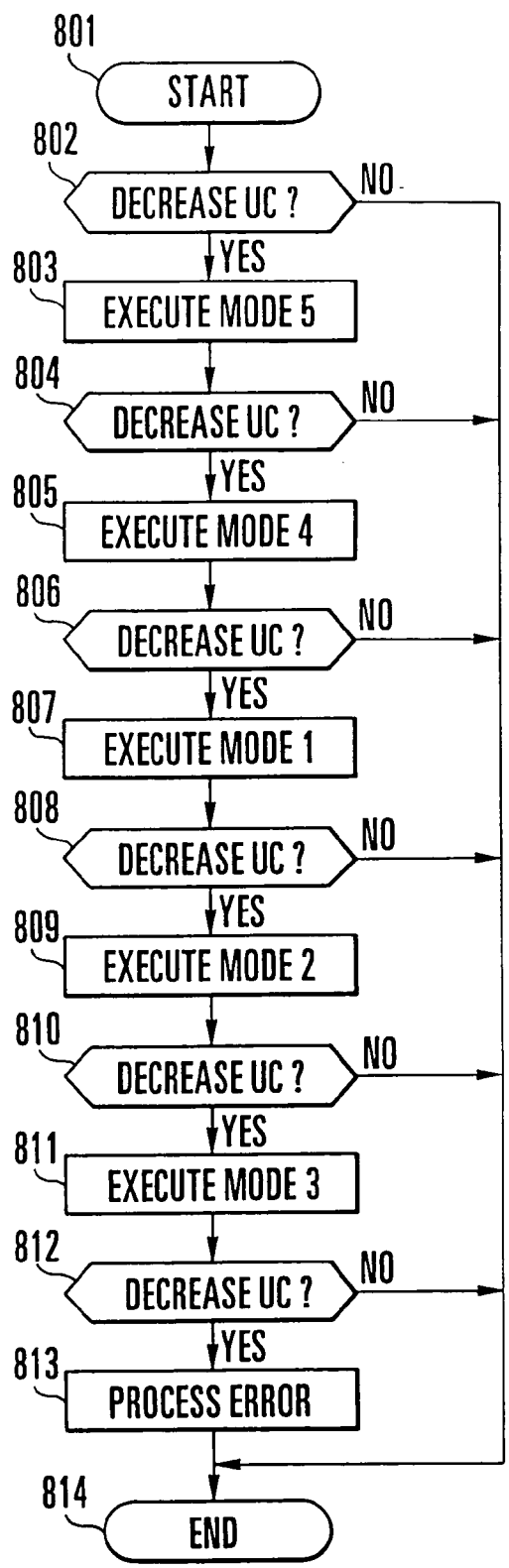
FIG. 14 is a flow chart showing an operation of a fifth embodiment of this invention.

Referring to FIG. 14 which is a flow chart, an algorithm begins at a step 801. At a step 802, a check is made to find if the amount of electric power UC is to be decreased. If not, the flow of operation comes to an end at a step 814. At steps 804, 806, 808, 810 and 812, checks for the necessity of decreasing the amount of electric power UC are made in exactly the same manner, which corresponds to the decision made at the step 505 of the fourth embodiment as to whether or not the amount of electric power UC is to be decreased.

If the result of the decision made at the step 802 is "YES", a mode 5 is executed at a step 803. In the mode 5, the image pickup system either stops a light projecting function of the light unit 122 or decreases the amount of illumination light to be projected by the light unit 122.

After that, when the result of check made at the step 804 is "YES", the flow comes to a step 805 to execute a mode 4. In the mode 4, the action of the lens controller 114 is stopped. The lens controller 114 has a known focusing function and a known image stabilizing (image-shake preventing) function and is arranged to stop performing both of or one of these functions according to a control signal coming from the control unit 120. The flow then comes to the step 806.

If the result of the check made at the step 806 is "YES", the flow comes to a step 807 to execute a mode 1. In the mode 1, the control unit 120 sends a control signal to the timing signal generator (TG) 117 to reduce the number of frames of images to be taken per unit time by the CCD 115 to one half.

Next, if the result of the check made at the step 808 is "YES", the flow comes to a step 809. At the step 809, a mode 2 is executed. In the mode 2, a color information reading action is stopped. To be more specific, the mode 2 is as follows. Generally, the CCD 115 sends a luminance signal and color-difference signals to the A/D converter 116. In the mode 2, the control unit 120 sends the control signal to the TG 117 to cause this action to be changed as follows.

The CCD 115 ceases to send the color-difference signals and sends out only the luminance signal. The A/D converter 116 performs its A/D converting action only on the luminance signal. The DSP 118 also processes only the luminance signal. As a result, the signal sent to the computer 103 carries an image in monochrome. The amount of information read out from the CCD 115 and processed by the DSP 118 thus decreases, so that the amount of consumption of electric power by the image pickup unit 101 can be reduced in the mode 2.

With the check for the necessity of decreasing the amount of electric power UC further made at the step 810, if the result of the check is "YES", the flow comes to a step 811 to execute a mode 3. In the mode 3, the number of picture elements to be read out is reduced. To be more specific, the mode 3 is as follows. The number of picture elements used at the CCD 115 in picking up an image is assumed to be "x" in the horizontal direction and to be "y" in the vertical direction. In the mode 3, the control unit 120 sends a control signal to the TG 117 to change this action as follows. The A/D converter 116 is caused to A/D-convert only one picture element out of every two picture elements in the horizontal direction and only one line out of every two lines in the vertical direction. The number of picture elements used in picking up an image is thus reduced to one fourth of the normal number of picture elements. The DSP 118 also processes only one fourth of the normal number of picture elements. As a result, the amount of image data sent to the computer 103 is thus reduced to one fourth of the normal amount.

In a case where the execution of all these power saving modes still fails to make the operation of the image pickup system possible, the result of check made at the step 812 for the necessity of reduction in the amount of electric power UC becomes "YES". The flow then comes to a step 818 to execute an error processing process. After that, the flow comes to an end at a step 814.

What is claimed is:

1. A unit detachable connectable to an apparatus which includes an electric power source, comprising:

a communication device, arranged to transmit electric power consumption information of said unit to said apparatus which includes the electric power source; and a control device, arranged to effect control so that an operation mode of said unit is switched to a mode for reducing power consumption thereof, in accordance with a control signal supplied from said apparatus in response to the electric power consumption information transmitted thereto by said communication device, wherein said apparatus which includes the electric power source is arranged so as to be detachably connectable to a plurality of units and supply electric power to each of said plurality of units.

2. A unit according to claim 1, wherein said communication device transmits information obtained by said unit to said apparatus in addition to the electric power consumption information of said unit.

3. A unit according to claim 2, wherein said unit is an image pickup unit, and wherein the information obtained by said unit is an image pickup data of the image pickup unit.

4. A control method of a unit which is detachably connectable to an apparatus which includes an electric power source, comprising the steps of:

transmitting electric power consumption information of said unit to said apparatus which includes the electric power source; and effecting control so that an operation mode of said unit is switched to a mode for reducing power consumption thereof, in accordance with a control signal supplied from said apparatus in response to the electric power consumption information transmitted thereto in said transmitting step, wherein said apparatus which includes the electric power source is arranged so as to be detachably connectable to a plurality of units and supply electric power to each of said plurality of units.

* * * * *